US009424449B2

(12) United States Patent
Erez et al.

(10) Patent No.: US 9,424,449 B2
(45) Date of Patent: Aug. 23, 2016

(54) RFID SYSTEM AND A METHOD FOR MANIPULATING PASSIVE RFID TAGS

(71) Applicants: Uri Erez, Tel Aviv (IL); Elad Domanovitz, Mazkeret Batia (IL)

(72) Inventors: Uri Erez, Tel Aviv (IL); Elad Domanovitz, Mazkeret Batia (IL)

(73) Assignees: Uri Erez, Tel Aviv (IL); Elad Domanovitz, Mazkeret Batia (IL)

( * ) Notice: Subject to any disclaimer, the term of this patent is extended or adjusted under 35 U.S.C. 154(b) by 0 days.

(21) Appl. No.: 14/732,917

(22) Filed: Jun. 8, 2015

(65) Prior Publication Data
US 2015/0356329 A1 Dec. 10, 2015

Related U.S. Application Data

(60) Provisional application No. 62/009,261, filed on Jun. 8, 2014.

(51) Int. Cl.
*G06K 7/10* (2006.01)
*G06Q 30/00* (2012.01)

(52) U.S. Cl.
CPC ........... *G06K 7/10128* (2013.01); *G06Q 30/00* (2013.01)

(58) Field of Classification Search
CPC .................................. H04Q 5/22; F04B 49/06
USPC ............................ 235/375; 340/10.4, 539.12
See application file for complete search history.

(56) References Cited

U.S. PATENT DOCUMENTS

| | | | | |
|---|---|---|---|---|
| 2009/0210294 | A1* | 8/2009 | Sakamoto | F04B 49/06 700/1 |
| 2009/0303013 | A1* | 12/2009 | Edgerton | G06K 7/0008 340/10.1 |
| 2010/0171595 | A1* | 7/2010 | Fujino | G06K 7/0008 340/10.2 |
| 2011/0115620 | A1* | 5/2011 | Myers | G06F 19/3462 340/539.12 |
| 2012/0000985 | A1* | 1/2012 | Bove | G06K 19/07345 235/492 |
| 2012/0086558 | A1* | 4/2012 | Teske | G08G 1/017 340/10.4 |

* cited by examiner

*Primary Examiner* — Allyson Trail
(74) *Attorney, Agent, or Firm* — Reches Patents (57) ABSTRACT

A method, comprising: sending, by a radio frequency identification (RFID) reader, an identification request to an RFID tag; wherein the RFID tag is positioned within a coverage area of the RFID tag; searching, by the RFID reader, a lack of response from the RFID tag to the identification request during a silent period that ranges between a fraction of a second and a minute; and controlling, by the RFID reader and in response to a detection of the lack of response, a circuit that differs from the RFID reader and the RFID tag.

19 Claims, 9 Drawing Sheets

RFID SYSTEM AND A METHOD FOR MANIPULATING PASSIVE RFID TAGS

RELATED APPLICATION

This application claims priority from provisional patent Ser. No. 62/009,261 filing date Jun. 8, 2014 which is incorporated herein by reference in its entirety.

BACKGROUND

Radio-frequency identification (RFID) is the wireless non-contact use of radio-frequency electromagnetic fields to transfer data, for the purposes of automatically identifying and tracking tags attached to objects. The tags contain electronically stored information. Some tags are powered by and read at short ranges (a few meters) via magnetic fields (electromagnetic induction). Others use a local power source such as a battery, or else have no battery but collect energy from the interrogating EM field, and then act as a passive transponder to emit microwaves or UHF radio waves (i.e., electromagnetic radiation at high frequencies).

RFID tags contain at least two parts: an integrated circuit for storing and processing information, modulating and demodulating a radio-frequency (RF) signal, collecting (in case of passive tags) DC power from the incident reader signal, and other specialized functions; and an antenna for receiving and transmitting the signal. The tag information is stored in a non-volatile memory. The RFID tag includes either a chip-wired logic or a programmed or programmable data processor for processing the transmission and sensor data, respectively.

RFID systems can be classified by the type of tag and reader. A Passive Reader Active Tag (PRAT) system has a passive reader which only receives radio signals from active tags (battery operated, transmit only). An Active Reader Passive Tag (ARPT) system has an active reader, which transmits interrogator signals and also receives authentication replies from passive tags.

Frequencies at use include:

| Band | regulations | Range (meters) | Data speed |
| --- | --- | --- | --- |
| 120-150 Khz (LF) | Unregulated | 0.1 | Low |
| 13.56 Mhz (HF) | ISM band | 0.1-1 | Low to moderate |
| 433 Mhz (UHF) | Short range devices | 1-100 | Moderate |
| 865-868 Mhz (Europe) 902-928 (North America) | ISM band | 1-12 | Moderate to high |

Both electric (E) and magnetic (H) fields at radiofrequencies decrease exponentially with distance from the boundary of a (human/animal) tissue because of energy dissipation after reflection. Penetration depth is defined as the distance in which the power density decreases by a factor of $e^{-2}$ (13.5 percent), and is a function of frequency and tissue properties.

At higher frequencies, the radiation fields penetrate a much smaller depth than at lower frequencies. In other words, at the higher end of the RFID spectrum, the radiated electromagnetic field is absorbed to a large extent in human tissue. For example, at 2.45 GHz (microwave oven frequency), penetration depth in tissue is about 2.0 cm, whereas at 10 GHz, it is only about 0.4 cm. At higher frequencies, any heating that occurs is primarily surface heating. Penetration depth for fat and bone is nearly five times greater than for higher-water-content tissues.

SUMMARY

There are provided systems, methods and non-transitory computer readable media for an RFID system and a method for inputting information by manipulating passive RFID tags, as illustrated in the claims.

According to an embodiment of the invention there may be provided a method that include sending, by a radio frequency identification (RFID) reader, an identification request to an RFID tag; wherein the RFID tag may be positioned within a coverage area of the RFID tag; searching, by the RFID reader, for a lack of response from the RFID tag to the identification request during a silent period that ranges between a fraction of a second and a minute; and controlling, by the RFID reader and in response to a detection of the lack of response, a circuit that differs from the RFID reader and the RFID tag.

The sending of the identification request may be preceded by successfully receiving from the RFID tag a response to a previous identification request.

The method may include sending a group of spaced apart identification requests to the RFID tag; searching for a first pattern that may include multiple spaced apart silent periods that range between a fraction of a second and a minute; and controlling the circuit in response to a detection of the first pattern.

The method may include sending to multiple RFID tags the identification request; searching, by the RFID reader, for a second pattern that may include at least one lack of response from at least one of the multiple RFID tags to the identification request during at least one silent period that ranges between a fraction of a second and a minute; and controlling the circuit in response to a detection of the at least one silent period.

The RFID reader may be configured to select a control command out of multiple control commands based upon at least one RFID tag that may be associated with the at least one silent period.

The second pattern corresponds to an identification key.

The controlling of the circuit may include activating the circuit and deactivating the circuit.

The controlling of the circuit may include activating the circuit, deactivating the circuit and determining a manner in which the circuit operated after the circuit may be activated.

The controlling of the circuit may be responsive to a duration of the silent period.

According to an embodiment of the invention there may be provided a system may include a radio frequency identification (RFID) reader that may include a radio frequency (RF) transmitter, an RF receiver and a processor; wherein the RF transmitter may be configured to send an identification request to an RFID tag; wherein the RFID tag may be positioned within a coverage area of the RFID tag; wherein the RF receiver may be configured to receive RF signals from the RFID tag; wherein the processor may be configured to search for a lack of response from the RFID tag to the identification request during a silent period that ranges between a fraction of a second and a minute; and control, in response to a detection of the lack of response, a circuit that differs from the RFID reader and the RFID tag.

The system may include the RFID tag.

The RFID reader may be configured to send to multiple RFID tags the identification request; wherein the processor may be configured to search for a second pattern that may include at least one lack of response from at least one of the multiple RFID tags to the identification request during at least one silent period that ranges between a fraction of a second and a minute; and wherein the processor may be configured to control the circuit in response to a detection of the at least one silent period.

The multiple RFID tags form an RFID keypad.

The RFID keypad may include an interface for detachably connecting the RFID keypad to a windshield.

According to an embodiment of the invention there may be provided a non-transitory computer readable medium that stores instructions that once executed by a radio frequency identification (RFID) reader causes the RFID reader to send an identification request to an RFID tag; wherein the RFID tag may be positioned within a coverage area of the RFID tag; search for a lack of response from the RFID tag to the identification request during a silent period that ranges between a fraction of a second and a minute; and control, in response to a detection of the lack of response, a circuit that differs from the RFID reader and the RFID tag.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores functions that once executed by a computer result in the execution of the method.

Any reference in the specification to a system should be applied mutatis mutandis to a method that may be executed by the system and should be applied mutatis mutandis to a non-transitory computer readable medium that stores functions that may be executed by the system.

Any reference in the specification to a non-transitory computer readable medium should be applied mutatis mutandis to a system capable of executing the functions stored in the non-transitory computer readable medium and should be applied mutatis mutandis to method that may be executed by a computer that reads the functions stored in the non-transitory computer readable medium.

Since there exist frequencies (the high end of the frequency range used in RFID systems) in which the human tissue can block (absorb) the electromagnetic radiation used in RFID signaling, the idea is to generate an ARPT (Active Reader Passive Tag) system which identifies when a tag is being temporarily blocked by human tissue. An RFID tag can be considered blocks when the RFID reade does not receive any signal from the RFID tag or when the level of signal from the RFID tag is weak—for example—is below a threshold that is between 5-50% of the signal when the RFID tag is not blocked. The threshold can be set to any other percentage. The threshold can be fixed or change over time. The act of blocking of a tag, rather than being a detrimental effect as in standard application of RFID technology, will be intentional. That is, covering the RFIF sticker by human tissue (i.e., a finger, etc.) will be interpreted as a cue to trigger a desired action. The RFID may be blocked by a user without disturbing the line of sight between the RFID reader and the RFID tag.

The combined act of blocking an RFID tag in conjunction with the induced action taken by the reader will amount to an "RFID switch", where the status of the switch is changed by placing a finger (or other human tissue) so as to cover the RFID tag.

The switch may equally be regarded and used as a "key". That is, a single reader working with several RFID tags in the aforementioned mode of use will produce a keypad.

When a specific tag is covered, the software at the reader end will determine the identity of the tag covered (as each tag has a unique ID), thus distinguishing between the different keys.

The RFID keypad can be used for any purpose an ordinary keypad is used but without needing a power supply (at the keypad end). For instance, a user may be required to key in a code (sequence of keys) using the touchpad (rather than a single key press) to trigger some desired action (e.g., opening of a door).

Figure 1:
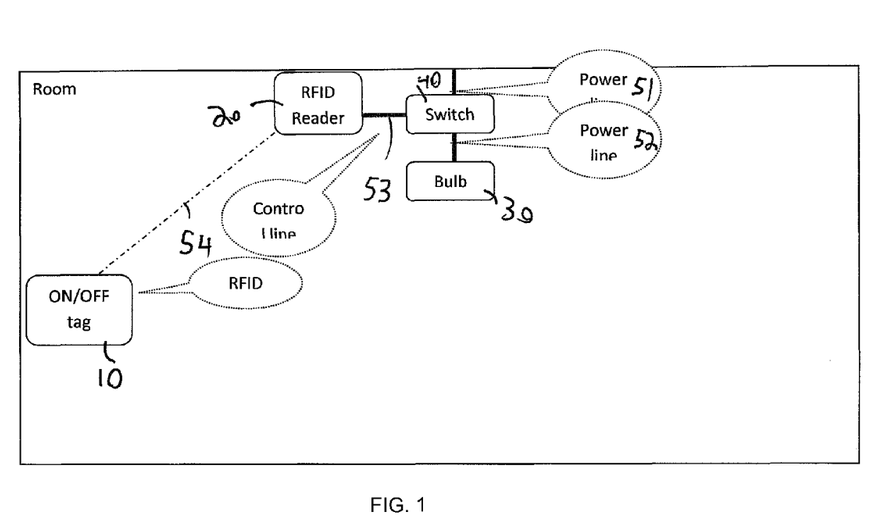
FIG. 1 illustrates a circuit and a system that includes at least one RFID tag and an RFID reader according to an embodiment of the invention.
Figure 2:
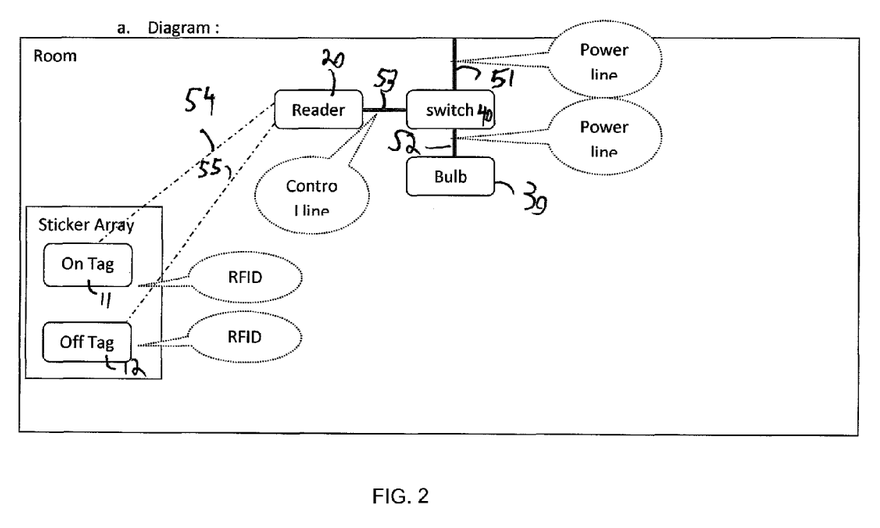
FIG. 2 illustrates a circuit and a system that includes at least one RFID tag and an RFID reader according to an embodiment of the invention.
Figure 3:
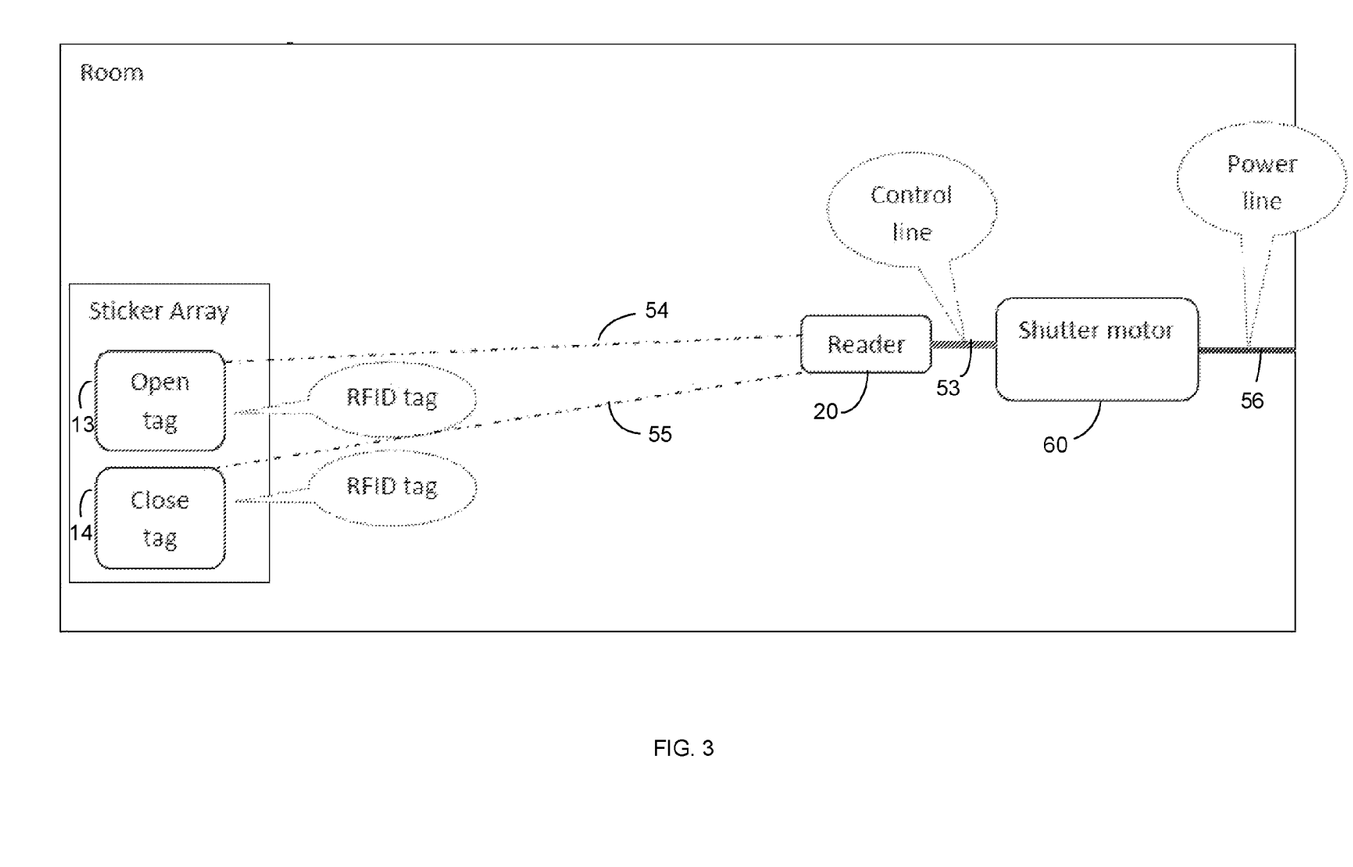
FIG. 3 illustrates a circuit and a system that includes at least one RFID tag and an RFID reader according to an embodiment of the invention.
Figure 4:
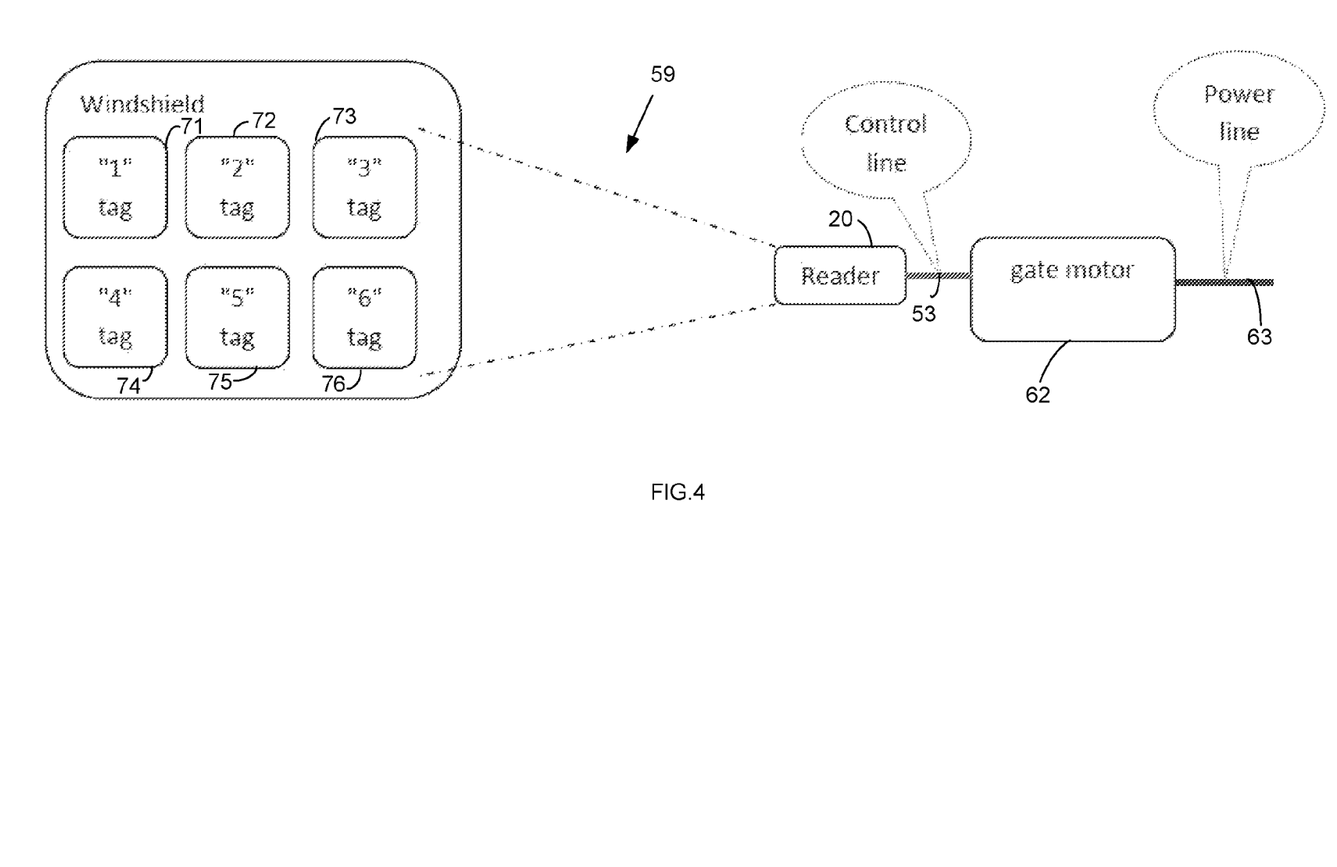
FIG. 4 illustrates a circuit and a system that includes at least one RFID tag and an RFID reader according to an embodiment of the invention.
Figure 5:
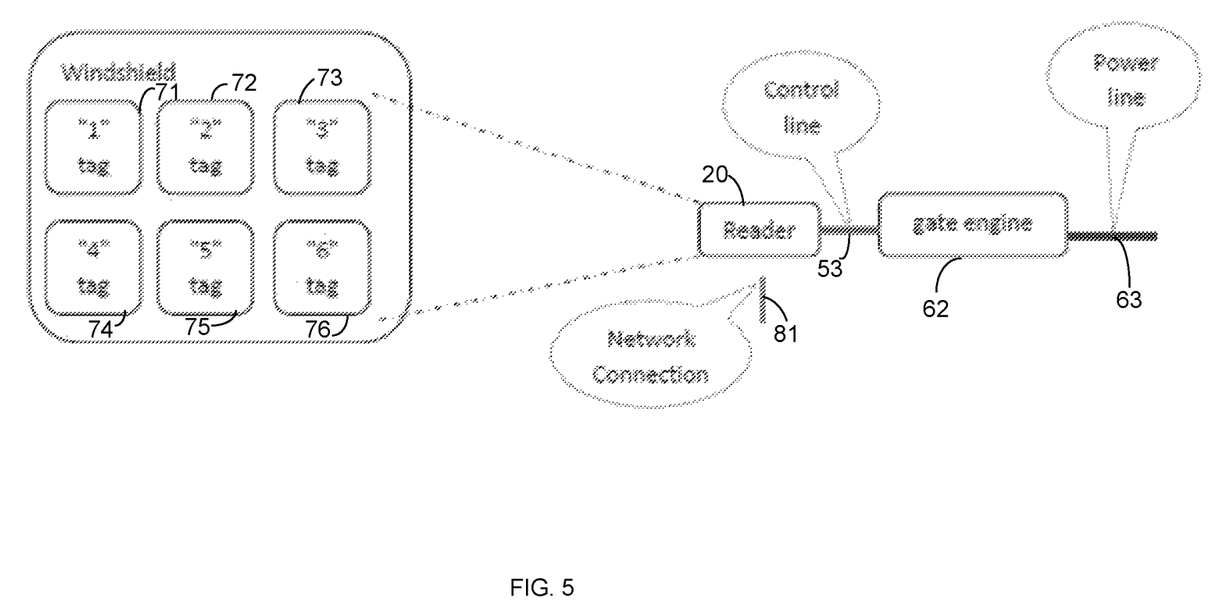
FIG. 5 illustrates a circuit and a system that includes at least one RFID tag and an RFID reader according to an embodiment of the invention.

FIGS. 1-5 illustrates circuits and systems that include at least one RFID tag and RFID reader according to various embodiments of the invention. In FIGS. 1 and 2 the circuit is a light bulb. In FIG. 3 the circuit is a shutter motor. In FIGS. 4-5 the circuit is a gate motor.

FIG. 1 illustrates an RFID tag 10, an RFID reader 20 that controls the supply of power (via switch 40) to light bulb 30.

FIG. 1 also shows RFID signals 54 exchanged between RFID tag 10 and RFID reader 20, control link 53 between RFID reader 20 and switch 40 and power lines 51 and 52—one entering switch 40 and one coupled between the switch and bulb 30.

The RIFD tag 10 is a light switch that does not require power. It is a passive RFID tag that can be located anywhere without any need for expensive installation. There is no need to supply a switch for controlling the RFID tag. Rather, the RFID tag itself serves as the switch.

Changing the status of the light bulb (from on to off or vice versa) will be done by covering the RFID tag 10 by a person (thus blocking the signal between the reader and the tag) for a predefined duration (between a fraction of a second and less than a minute). The fraction of a second may be 0.1-0.9 seconds or any other value that is below one second.

RFID reader 20 (which for example can operate in the UHF range reader for which both penetration depth is small enough to block the signal and the range of detection is large enough for such applications) will identify that it lost the signal from the RFID tag 10. At this point the RFID reader 20 will make sure that it's an intended blocking (by monitoring that the signal remains blocked over multiple reading attempts during a predefined period), after which it will take action and change the status of the power/light.

FIG. 2 illustrates an array of two RFID tags 11 and 12 (one RFID tag is associated with an "on" operation, another RFID tag is associated with an "off" operation) which is located anywhere in the room.

FIG. 2 also shows RFID signals 55 and 45 exchanged between RFID tags 11 and 12 and RFID reader 20, control link 53 between RFID reader 20 and switch 40 and power lines 51 and 52—one entering switch 40 and one coupled between the switch and bulb 30.

The RFID reader 20 may be connected to the light bulb (for example replacing the light bulb holder with a reader which is connected to a switch which turns the light on/off based on the inputs it gets from the tag).

The RFID reader controls a switch 40 which determines if power will reach the bulb or not.

Intentional concealment of "On tag" turns on the bulb and an intentional concealment of "Off tag" turns off the bulb.

FIG. 3 illustrates a dual tag shutter open/close controller. The two RFID tag 13 and 14 are allocated so that one RFID tag is associated with an "open" operation and another RFID tag is associated with a "close" operation. Both RFID tags are located anywhere in the room.

FIG. 3 also shows RFID signals 55 and 45 exchanged between RFID tags 13 and 14 and RFID reader 20, control link 53 between RFID reader 20 and shutter motor 60 and power line 56 coupled to the shutter motor.

The RFID reader 20 is connected to the motor of the shutter (shutter motor 60) and controls its activation A detection of an intentional concealment of "Open tag" opens the shutter and a detection of an intentional concealment of "Close tag" closes the shutter. When both are detected, no action is applied on the shutter.

Logic can be added to the RFID reader to send a "stop" signal to the motor if "Open Tag" intentional concealment is detected (again) before reaching fully open state. Likewise for close.

FIG. 4 illustrates a keypad 70 for opening a gate/garage door. The keypad 70 may be attached to a windshield of a car.

FIG. 4 also shows RFID signals 59 exchanged between keypad 70 and RFID reader 20, control link 53 between RFID reader 20 and gate motor 62 and power line 62 coupled to the gate motor.

Keypad 70 includes multiple (N) stickers (such as stickers 71-76).

RFID reader 20 may be connected to the motor of the gate (gate motor 62) and controls its activation.

When a vehicle is detected as stopping at the gate (e.g., reader detects one or more (unconcealed) tags), the RFID reader 200 prompts "type entry code".

The user types a predefined code by touching (or placing an organ in proximity to) one or more RFID tags to form a sequence.

The RFID reader checks the sequence to see if it matches to a predefined second pattern.

If the right sequence was typed, the gate is opened.

FIG. 5 illustrates a Keypad 70 for paying a fee (when exiting parking lot for example).

FIG. 5 also shows RFID signals 59 exchanged between keypad 70 and RFID reader 20, control link 53 between RFID reader 20 and gate motor 62 and power line 62 coupled to the gate motor.

Keypad 70 may include N RFID tags (such as RFID tags 71-76) which may be attached to the windshield of the car RFID reader 20 is connected to the motor of the gate and controls its activation+ has a connection to the network.

When a user wants to exit a parking lot, the RFID reader detects the car and shows the amount of money to pay.

The user types (using the RFID keypad) a verification code that allows to deduct this amount from a credit card.

The RFID reader checks the verification code, and once it gets an approval it opens the gate and deducts sum from account/credit card.

Figure 6:
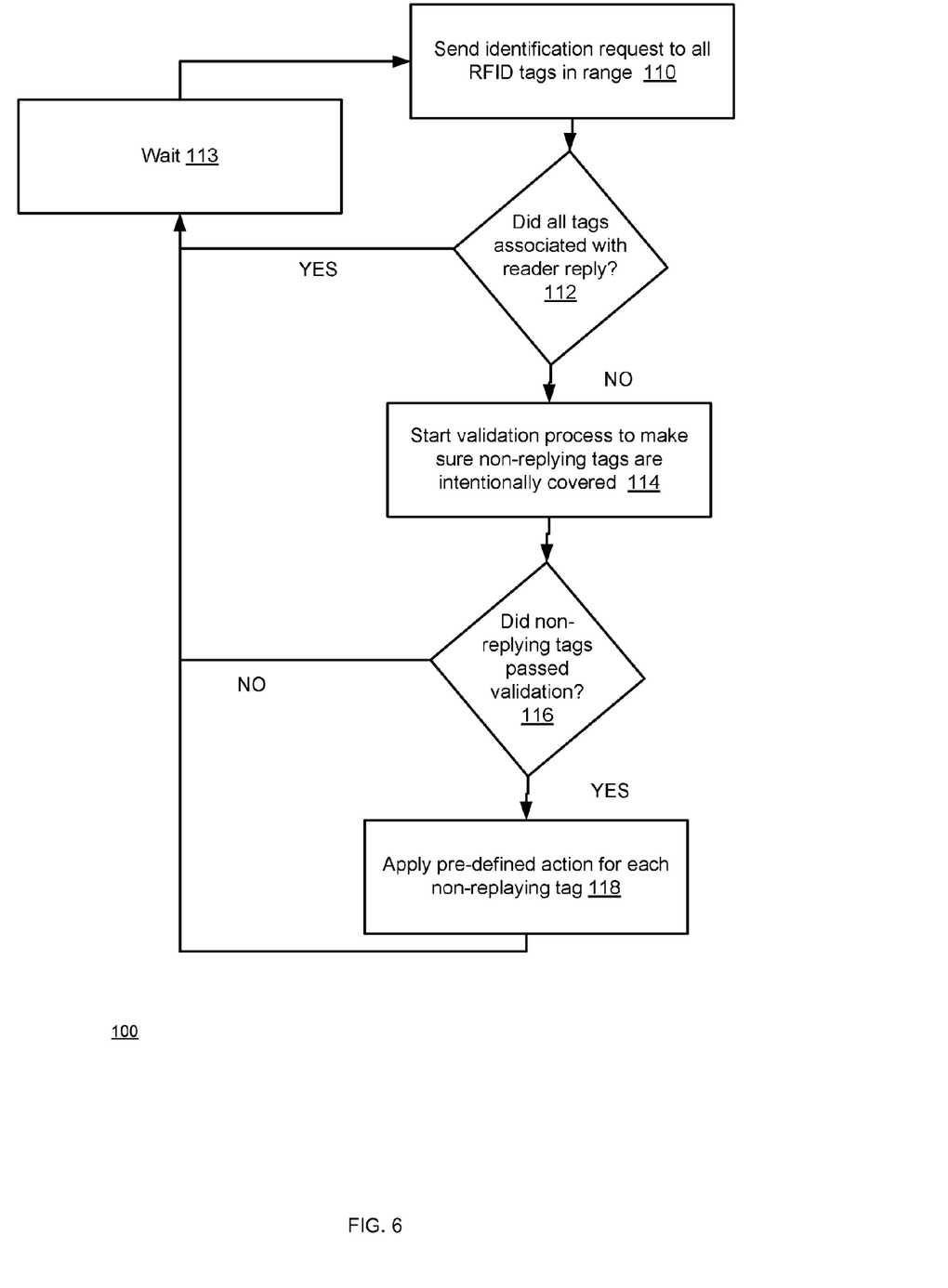
FIG. 6 illustrates a method according to an embodiment of the invention.

FIG. 6 illustrates method 100 according to an embodiment of the invention.

Method 100 is executed by an RFID reader.

Method 100 starts by step 110 of sending an identification request to all RFID tags in range (of the RFID reader).

Step 110 is followed by query step 112 of checking if all tags associated with the RFID reader reply.

If the answer is positive then step 112 is followed by waiting (step 113) and then jumping to step 110.

If the answer is negative then step 112 is followed by step 114 of Starting a validation process to make sure non-replying RFID tags are intentionally covered.

Step 140 is followed by query step 116 of checking if non-replying RFID tags passed validation.

If the answer is positive then step 116 is followed by step 118 of applying a pre-defined action for each non-replying tag. Step 118 is followed by step 113.

If the answer is negative then step 116 is followed by step 113.

Figure 7:
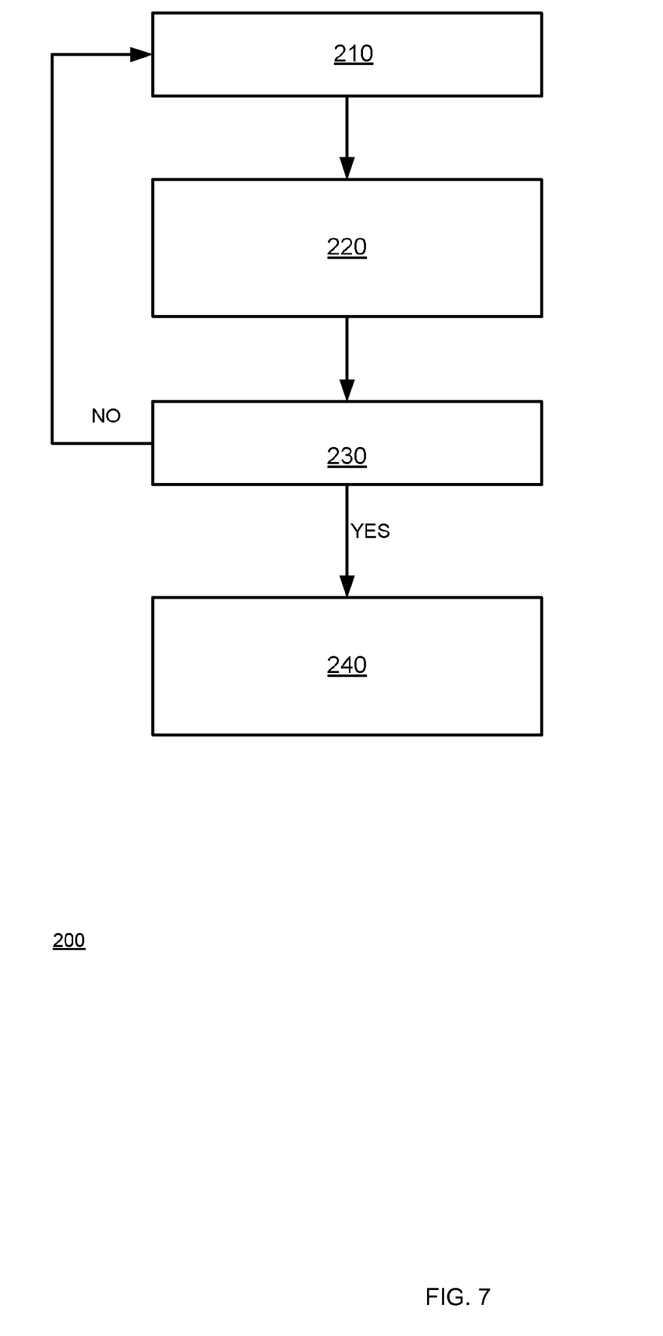
FIG. 7 illustrates a method according to an embodiment of the invention.

FIG. 7 illustrates method 200 according to an embodiment of the invention.

Method 200 may start by step 210 of sending, by a RFID reader, an identification request to an RFID tag. The RFID tag is positioned within a coverage area of the RFID tag.

The RFID reader may expect to receive a response to the identification request as the RFID tag is within the coverage area of the RFID tag and may have previously successfully receive from the RFID tag a response to a previous identification request. The RFID tag may be paired to the RFID reader.

Step 210 may be followed by step 220 of searching, by the RFID reader, for a lack of response from the RFID tag to the identification request during a silent period that ranges between a fraction of a second and a minute.

If the lack of response is not detected the method may continue by waiting to a next detection iteration.

The RFID reader should detect an intentional concealment of the RFID tag by a person—either by contacting the RFID tag or by placing a human organ close enough to the RFID tag in order to prevent the RFID tag from responding to the identification request.

Thus—the detected silent period should be long enough (at least a fraction of a second) to ignore short and unintentional blocking of the RFID tag but should short enough (less than a minute) to ignore a permanent blocking of the RFID tag, an irreversible malfunction of the RFID tag and the like.

Step 220 may be followed by step 230 of controlling, by the RFID reader and in response to the detection of the lack of response, a circuit that differs from the RFID reader and the RFID tag. For example—controlling a supply of power to a light bulb or other electronic device.

The controlling of the circuit may be limited to activating the circuit and deactivating the circuit.

The controlling may include activating the circuit, deactivating the circuit and determining a manner in which the circuit operated after the circuit is activated. For example—controlling an intensity of an operation of the circuit, controlling a duration and/or a time of operation of the circuit and the like.

Figure 8:
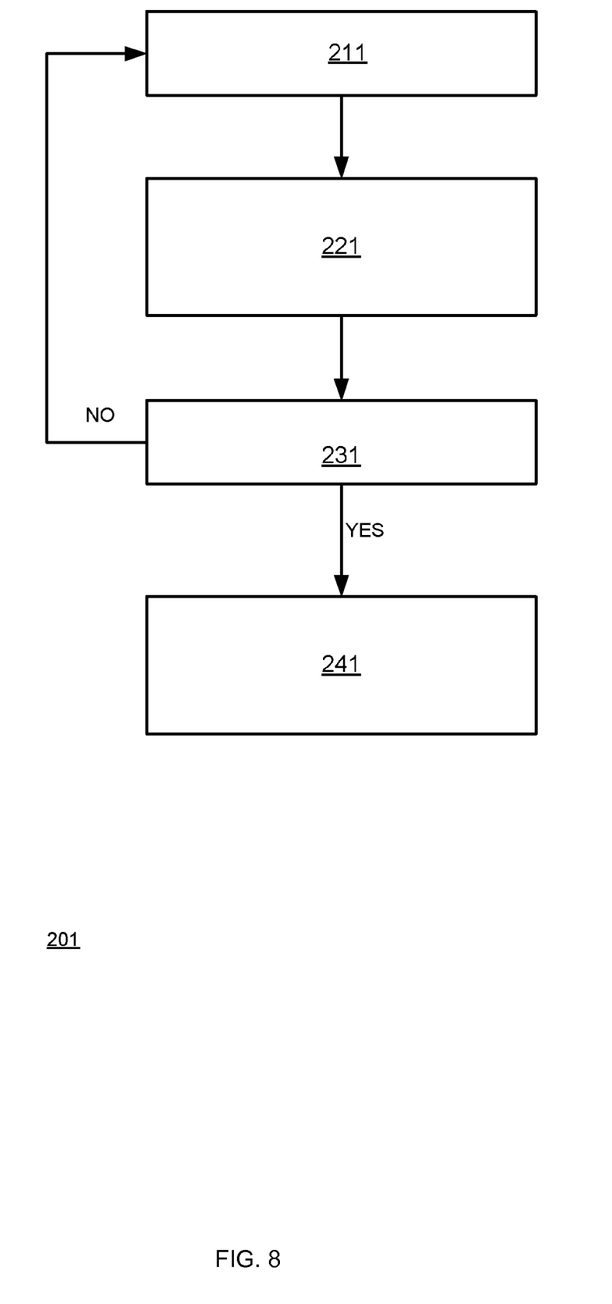
FIG. 8 illustrates a method according to an embodiment of the invention.

Step 230 of controlling may be responsive to a duration of the silent period FIG. 8 illustrates method 201 according to an embodiment of the invention.

Method 201 may start by step 211 of sending, by a RFID reader, a group of spaced apart identification requests to the RFID tag. The RFID tag is positioned within a coverage area of the RFID tag.

Step 211 may be followed by step 221 of searching a first pattern that comprises multiple spaced apart silent periods that range between a fraction of a second and a minute. Silent periods that are shorter than the fraction of a second can be ignored of.

Step 221 may be followed by step 231 of controlling the circuit in response to a detection of the first pattern.

If the first pattern is not detected the method may continue by waiting to a next detection iteration.

Figure 9:
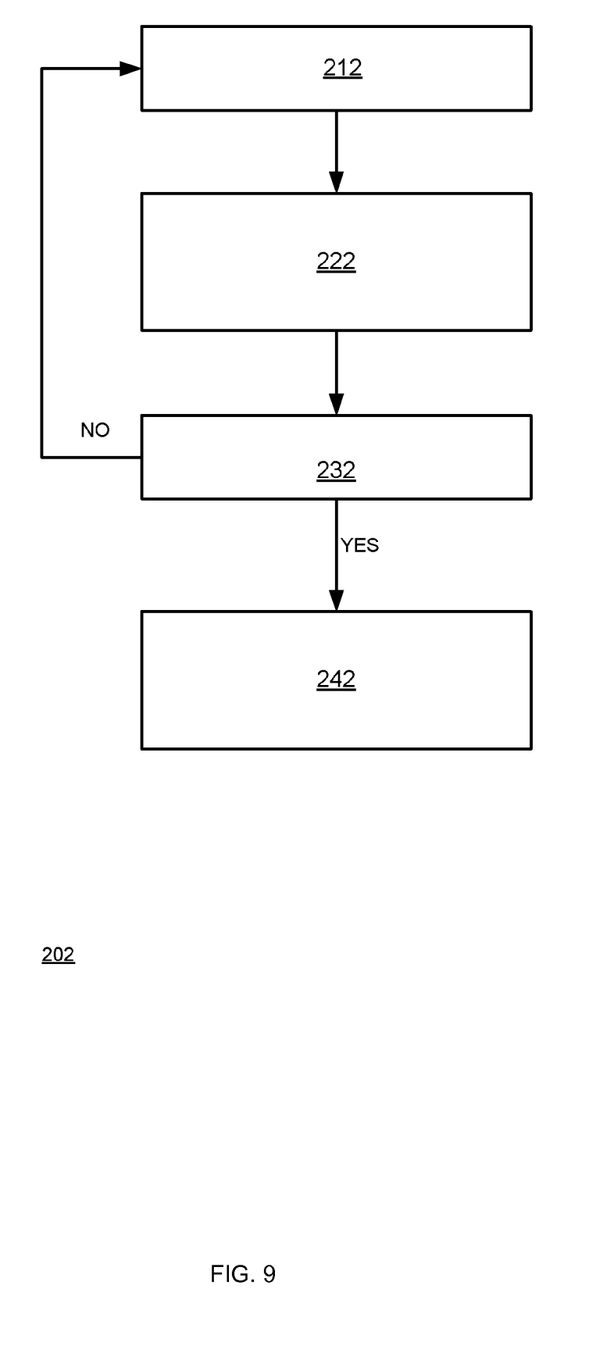
FIG. 9 illustrates a method according to an embodiment of the invention.

FIG. 9 illustrates method 202 according to an embodiment of the invention.

Method 202 may start by step 212 of sending to multiple RFID tags the identification request.

Step 212 may be followed by step 222 of searching, by the RFID reader, for a second pattern that includes at least one lack of response from at least one of the multiple RFID tags to the identification request during at least one silent period that ranges between a fraction of a second and a minute.

Step 222 may be followed by step 232 of controlling the circuit in response to the detection of the second pattern.

Step 232 may include selecting a control command out of multiple control commands based upon at least one RFID tag that is associated with the at least one silent period. For example, in FIGS. 2-3 different RFID tags are associated with different commands.

Figure 10:
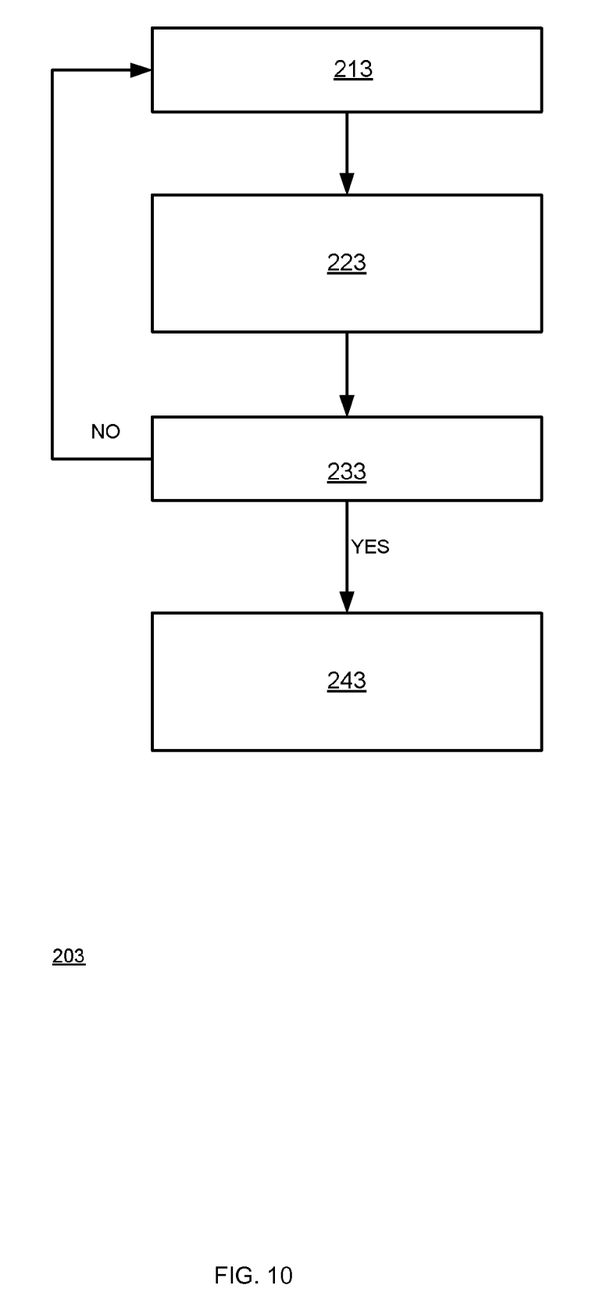
FIG. 10 illustrates a method according to an embodiment of the invention.

FIG. 10 illustrates method 203 according to an embodiment of the invention.

Method 203 may start by step 213 of sending to multiple RFID tags a group of spaced apart identification requests.

Step 213 may be followed by step 223 of searching, by the RFID reader, for a second pattern that includes at least one lack of response from at least one of the multiple RFID tags to the identification request during at least one silent period that ranges between a fraction of a second and a minute.

Step 223 may be followed by step 233 of controlling the circuit in response to the detection of the second pattern.

Step 233 may include selecting a control command out of multiple control commands based upon at least one RFID tag that is associated with the at least one silent period. For example, in FIGS. 2-3 different RFID tags are associated with different commands.

Although the previous text referred to RFID technology it is applicable to other technologies (such as but not limited to BlueTooth, BLE, WiFi, Zigbee) and any other technologies that communicate using radiation that can be blocked by human tissue. Thus, a first wireless transceiver can detect (for example by polling) that a second wireless transceiver (that is expected to transmit to the first wireless transceiver) is temporarily blocked (for a duration that ranges between a fraction of a second and for less then, for example, a minute)—by detecting that the second transceiver did not transmit to the first wireless transceiver (for example—did not respond to a query from the first wireless transceiver) and trigger an operation. Any reference to RFID should be interpreted to a reference to such wireless communication technology.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of functions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method, the method comprising:
   sending, by a radio frequency identification (RFID) reader, a group of spaced apart identification requests to an RFID tag;
   wherein the RFID tag is positioned within a coverage area of the RFID tag;
   searching, by the RFID reader, for a first pattern that comprises multiple spaced apart silent periods that range between a fraction of a second and a minute; and
   controlling, by the RFID reader and in response to a detection of the first pattern, a circuit that differs from the RFID reader and the RFID tag.

2. The method according to claim 1 wherein the sending of the group of spaced apart identification requests is preceded by successfully receiving from the RFID tag a response to a previous identification request.

3. The method according to claim 1 comprising sending to multiple RFID tags an identification request; searching, by the RFID reader, for a second pattern that comprises at least one lack of response from at least one of the multiple RFID tags to the identification request during at least one silent period that ranges between a fraction of a second and a minute; and controlling the circuit in response to a detection of the at least one silent period of the second pattern.

4. The method according to claim 3 comprising selecting, by the RFID reader a control command out of multiple control commands based upon at least one RFID tag that is associated with the at least one silent period of the second pattern.

5. The method according to claim 3 wherein the second pattern corresponds to an identification key.

6. The method according to claim 1 wherein the controlling of the circuit comprises activating the circuit and deactivating the circuit.

7. The method according to claim 1 wherein the controlling of the circuit comprises activating the circuit, deactivating the circuit and determining a manner in which the circuit operated after the circuit is activated.

8. The method according to claim 1 wherein the controlling of the circuit is responsive to a duration of a silent period of the first pattern.

9. A system comprising a radio frequency identification (RFID) reader that comprises a radio frequency (RF) transmitter, an RF receiver and a processor; wherein the RF transmitter is configured to send a group of spaced apart identification requests to an RFID tag; wherein the RFID tag is positioned within a coverage area of the RFID tag; wherein the RF receiver is configured to receive RF signals from the RFID tag; wherein the processor is configured to search for a first pattern that comprises multiple spaced apart silent periods that range between a fraction of a second and a minute; and control, in response to a detection of the first pattern, a circuit that differs from the RFID reader and the RFID tag.

10. The system according to claim 9 wherein the system is configured to send the group of spaced apart identification requests after successfully receiving from the RFID tag a response to a previous identification request.

11. The system according to claim 9 wherein the RFID reader is configured to send to multiple RFID tags an identification request; wherein the processor is configured to search for a second pattern that comprises at least one lack of response from at least one of the multiple RFID tags to the identification request during at least one silent period that ranges between a fraction of a second and a minute; and wherein the processor is configured to control the circuit in response to a detection of the at least one silent period of the second pattern.

12. The system according to claim 11 wherein the multiple RFID tags form an RFID keypad.

13. The system according to claim 12 wherein the RFID keypad comprises an interface for detachably connecting the RFID keypad to a windshield.

14. The system according to claim 11 wherein the RFID reader is configured to select a control command out of multiple control commands based upon at least one RFID tag that is associated with the at least one silent period of the second pattern.

15. The system according to claim 11 wherein the second pattern corresponds to an identification key.

16. A non-transitory computer readable medium that stores instructions that once executed by a radio frequency identification (RFID) reader causes the RFID reader to send a group of spaced apart identification requests to an RFID tag; wherein the RFID tag is positioned within a coverage area of the RFID tag; search for a first pattern that comprises multiple spaced apart silent periods that range between a fraction of a second and a minute; and control, in response to a detection of the first pattern, a circuit that differs from the RFID reader and the RFID tag.

17. The non-transitory computer readable medium according to claim 16 that stores instructions for selecting, by the RFID reader, a control command out of multiple control commands based upon at least one RFID tag that is associated with the at least one silent period of the second pattern.

18. The non-transitory computer readable medium according to claim 16 wherein the second pattern corresponds to an identification key.

19. The non-transitory computer readable medium according to claim 16 wherein the sending of the group of spaced apart identification requests is preceded by successfully receiving from the RFID tag a response to a previous identification request.

* * * * *